US012601320B2

(12) United States Patent
Eloy et al.

(10) Patent No.: US 12,601,320 B2
(45) Date of Patent: Apr. 14, 2026

(54) METHOD FOR MANAGING A STALL PHASE OF AN INTERNAL COMBUSTION ENGINE ASSOCIATED WITH AN ELECTRIC MOTOR

(71) Applicant: VITESCO TECHNOLOGIES GmbH, Regensburg (DE)

(72) Inventors: Stéphane Eloy, Toulouse (FR); Fabien Joseph, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/871,110

(22) PCT Filed: Jul. 20, 2023

(86) PCT No.: PCT/EP2023/070171

§ 371 (c)(1),
(2) Date: Dec. 2, 2024

(87) PCT Pub. No.: WO2024/022947

PCT Pub. Date: Feb. 1, 2024

(65) Prior Publication Data

US 2025/0341196 A1 Nov. 6, 2025

(30) Foreign Application Priority Data

Jul. 25, 2022 (FR) ....................................... 2207609

(51) Int. Cl.
*F02N 11/04* (2006.01)
*F02N 11/08* (2006.01)
*F02N 11/10* (2006.01)

(52) U.S. Cl.
CPC .............. *F02N 11/10* (2013.01); *F02N 11/04* (2013.01); *F02N 11/08* (2013.01); *F02N 2200/021* (2013.01)

(58) Field of Classification Search
CPC .......... F02N 11/10; F02N 11/04; F02N 11/08; F02N 2200/021; B60W 10/06;
(Continued)

(56) References Cited

U.S. PATENT DOCUMENTS 8,204,674 B2 6/2012 Kondo
9,429,092 B2 8/2016 Rosero
(Continued)

FOREIGN PATENT DOCUMENTS

CN 110966109 A 4/2020
EP 3141445 A1 3/2017

OTHER PUBLICATIONS

International Search Report and Written Opinion of the ISA for PCT/EP2023/070171, mailed Sep. 13, 2023, 14 pages.

*Primary Examiner* — Grant Moubry
(74) *Attorney, Agent, or Firm* — Nixon & Vanderhye

(57) ABSTRACT

A method for managing a stall phase of a heat engine associated with an electric motor, when an anomaly occurs during the course of a procedure for determining the angular position of same, comprising the following steps, once the anomaly has been detected:

- implementation of a diagnostics procedure associated with the fault,
- the reading of an indicator informing as to the mechanical connection of wheels to the heat engine,
- if no wheel is connected to the heat engine, a management device that manages the electric motor commands the electric motor to switch to a predetermined motor operating mode,
- said motor operating mode is maintained for as long as the diagnostics procedure remains uncompleted, then (Continued)

the electric motor is commanded to return to the operating mode in which it was operating before being switched to the predetermined motor operating mode.

12 Claims, 2 Drawing Sheets

(58) Field of Classification Search
CPC ................. B60W 10/08; B60W 20/50; B60W 2510/0685; B60W 2710/021
See application file for complete search history.

(56) References Cited

U.S. PATENT DOCUMENTS

| | | | | |
|---|---|---|---|---|
| 9,908,524 | B2 | 3/2018 | Asami et al. | |
| 10,208,690 | B2 | 2/2019 | Eom et al. | |
| 2006/0167615 | A1 | 7/2006 | Kunibe et al. | |
| 2007/0246012 | A1* | 10/2007 | Ando | F02D 41/009 123/406.62 |
| 2010/0292881 | A1 | 11/2010 | Takahashi | |
| 2014/0060486 | A1* | 3/2014 | Maezawa | F02D 45/00 123/350 |
| 2016/0121881 | A1 | 5/2016 | Kim et al. | |
| 2018/0100461 | A1* | 4/2018 | Eom | F02N 11/106 |
| 2019/0001963 | A1 | 1/2019 | Kim | |
| 2019/0003407 | A1 | 1/2019 | Kim | |
| 2019/0078525 | A1 | 3/2019 | Kwon et al. | |

* cited by examiner

METHOD FOR MANAGING A STALL PHASE OF AN INTERNAL COMBUSTION ENGINE ASSOCIATED WITH AN ELECTRIC MOTOR

CROSS-REFERENCE TO RELATED APPLICATIONS

This application is the U.S. national phase of International Application No. PCT/EP2023/070171 filed Jul. 20, 2023 which designated the U.S. and claims priority to FR 2207609 filed Jul. 25, 2022, the entire contents of each of which are hereby incorporated by reference.

DESCRIPTION

The present disclosure relates to a method for managing a stall phase of an internal combustion engine associated with an electric motor.

TECHNICAL FIELD

The technical field of the present disclosure is thus the field of engine management for an internal combustion engine (or heat or thermal engine). The present disclosure is more particularly intended for an automobile or the like (a motorbike, truck, etc.) with what is referred to as a hybrid propulsion system, which means to say that the vehicle comprises both an internal combustion engine and at least one electric motor.

In a hybrid vehicle, the heat engine may drive the vehicle "directly" via a transmission or else the heat engine is used to produce electricity which is then used to power the at least one electric motor which drives the vehicle.

The phase just before the internal combustion engine stops is referred to here as the stall phase: said engine is running and then stops. This stopping may be deliberate: the stall phase then corresponds to the phase of stopping between the moment at which the instantaneous rotational speed of the engine drops below a threshold (for example 100 revolutions per minute) and the internal combustion engine actually stopping. The stopping may also be unintentional, triggered by a non-commanded event: the stall phase then corresponds to the last few instants of rotation of the internal combustion engine before it actually stops.

PRIOR ART

In an internal combustion engine, whether or not it is associated with an electric motor, the various components need to be synchronized in order to achieve good combustion, which is to say combustion that limits both pollutant emissions and fuel consumption.

In an internal combustion engine, pistons slide in cylinders and, through a connecting-rod/crankshaft system, drive the rotation of a flywheel and this movement is passed on to the wheels of the vehicle in order to move same. In what is referred to as a four-stroke internal combustion engine, a complete combustion cycle takes place over two revolutions (of the flywheel), namely 720° (referred to as degrees crank or °CRK). In order to control the intake and exhausting of air into and from the cylinders, at least one camshaft controls valves. The rotational speed of a camshaft corresponds to (exactly) half the rotational speed of the flywheel (or of the crankshaft).

A (four-stroke internal combustion) engine is generally synchronized on the basis of two pieces of information: one piece of information regarding the angular position of a camshaft, and the other regarding the angular position of the flywheel (or crankshaft). Teeth are arranged uniformly at the periphery of the flywheel. One singularity, generally one or two consecutive missing teeth, provides a position reference for the flywheel. A sensor, referred to as a crankshaft sensor or crank sensor, detects the passage of each tooth of the flywheel and transmits this information to an electronic control unit to calculate the position of the internal combustion engine. As soon as the singularity is detected, the control unit is able to know the angular position of the crankshaft.

Similarly, a sensor, referred to as a camshaft sensor or cam sensor, is associated with a toothed wheel to determine the position of the corresponding camshaft.

Given the difference in the rotational speed of the camshaft with respect to the crankshaft, it is possible to determine the position of the heat engine.

If just one signal is defective, a diagnosis has to be performed in order to detect this defective signal. A backup strategy is then implemented to make it possible to continue to ensure synchronization and thereby (correct) operation of the heat engine.

The diagnosis on a signal from the crankshaft sensor or, respectively, the camshaft sensor, is performed by checking the other signal. If the signal from the crankshaft sensor or, respectively, the camshaft sensor, disappears while the signal from the camshaft sensor or, respectively, the crankshaft sensor, is still present, that means that the heat engine is still turning over. It is then possible to postulate a diagnosis that this crankshaft sensor or, respectively, camshaft sensor, signal is missing. Such a diagnosis requires the internal combustion engine to have performed a certain number of revolutions in order to confirm signal absence. In order to perform a diagnosis, there is a list of symptoms each corresponding to one or more anomalies (or faults). As soon as a symptom is detected, for example a singularity in a signal or a signal that is abnormally constant, the diagnostics procedure is implemented in order to confirm, or not confirm, the presence of an anomaly corresponding to this symptom.

In the case of a hybrid vehicle and, more particularly, when the heat engine is connected only to an electric machine in order to charge a battery (and is therefore not connected either directly or indirectly to the wheels of the vehicle), the heat engine stops very quickly. Indeed, because energy is generally recovered during deceleration, the resistive torque exerted on the internal combustion engine is greater, causing it to stall more quickly. In addition, when the heat engine is not connected to the wheels, it is unable to benefit from the inertia of the vehicle in order to drive it.

If, in addition, the crankshaft signal disappears, the synchronization of the internal combustion engine is lost and combustion (fuel injection) is inhibited for a moment, and this then precipitates the stopping of said engine.

In such unfavorable scenarios, and especially when the internal combustion engine can no longer be driven by the inertia of the vehicle, it is highly probable that the diagnostics procedure will not be able to be completed before the internal combustion engine completely stops. Thus, in the event of a crankshaft sensor signal fault for example, this signal fault will not be able to be confirmed before the internal combustion engine stops and the diagnosis will not be able to be confirmed and will therefore not be transmitted to the driver (signal on the dashboard).

At the next start, it will take a long time to achieve synchronization because the fault will not have been fully diagnosed during the stall phase. The diagnosis procedure is then recommenced and a backup strategy is implemented thereafter, if applicable.

SUMMARY

The present disclosure will improve the situation. It is notably aimed at enabling a diagnosis to be made before the internal combustion engine stops so that a suitable strategy, dependent on the diagnosis, can be implemented as soon as a restart is commanded.

What is proposed is a method for managing a stall phase of an internal combustion engine associated with an electric motor in a vehicle comprising wheels, when an anomaly occurs during the course of a procedure for determining the angular position of the internal combustion engine.

According to the present disclosure, this method comprises the following steps, once a symptom of the anomaly has been detected:

- implementation of a diagnostics procedure with a view to confirming the anomaly and/or determining its origin,
- the reading of an indicator informing as to the mechanical connection of wheels to the internal combustion engine,
- if no wheel of the vehicle is connected to the internal combustion engine, a management device that manages the electric motor commands the electric motor to switch to a predetermined motor operating mode,
- said motor operating mode is maintained for as long as the diagnostics procedure remains uncompleted, then
- the management device that manages the electric motor commands the electric motor to return to the operating mode in which it was operating before being switched to the predetermined motor operating mode.

What is novel here is that an electric motor is used to prevent the internal combustion engine from stopping immediately, or very (excessively) quickly, the engine then being kept turning for long enough for the diagnostics procedure to complete. When the internal combustion engine stops, if it stops, the fault that caused the stall is then determined and a suitable strategy (downgraded or non-downgraded mode) can then be implemented right from the beginning of the next start. What is meant here by an electric motor is any type of device that is able to provide mechanical torque when electrically powered. Here, this may also be any type of reversible electric machine able, in addition to performing its motor function, to convert mechanical energy into electrical energy (an alternator-starter, a reversible electric generator set, etc.).

The features set out in the following paragraphs can optionally be implemented independently of one another or in combination with one another:

- the anomaly affects a signal from a sensor associated with a crankshaft or a signal from a sensor associated with a camshaft;
- the diagnostics procedure aims to observe a symptom of the anomaly several times in succession, an index being incremented when a symptom of the anomaly is observed, and reset when the symptom of the anomaly no longer appears;
- the predetermined operating mode for the electric motor is an operating mode in which a setpoint rotational speed is imposed on the electric motor: in this instance, the rotational speed of the electric motor may advantageously be chosen such that it allows the internal combustion engine to be driven at a low-idle speed, for example between 600 and 900 revolutions per minute;
- at the end of the diagnostics procedure, if an anomaly is confirmed, the internal combustion engine switches to a suitable operating mode, for example a downgraded mode, whereas if no anomaly is confirmed, the operating mode of the internal combustion engine is not modified.

According to another aspect, the present disclosure also relates to an electronic engine management system for an internal combustion engine, characterized in that it comprises means for implementing each of the steps of a method described hereinabove. The engine management system according to the present disclosure advantageously comprises at least one processor equipped with one or more memories, with input and output interfaces that include:

- at least one input interface for receiving data necessary for the implementation of the diagnostics procedure with a view to confirming the anomaly and/or determining its origin, and for receiving data relating to the indicator informing as to the mechanical connection of wheels to the internal combustion engine, and
- at least one output interface for emitting a command instructing the electric motor to switch to a predetermined motor operating mode, and to emit a command instructing the electric motor to return to the operating mode in which it was operating before being switched to the predetermined motor operating mode once the diagnostics procedure is complete.

According to another aspect, there is also disclosed an automotive vehicle comprising an internal combustion engine and at least one electric motor for driving at least one wheel of the vehicle, characterized in that it comprises an abovementioned electronic management system.

Such an automotive vehicle may comprise transmission means providing transmission between the internal combustion engine and at least one wheel allowing the internal combustion engine to drive a wheel.

Alternatively, said automotive vehicle may be such that the internal combustion engine is connected to an electric generator set intended to charge at least one electric battery. In this alternative embodiment, the internal combustion engine is not connected to the wheels (to any one of same).

According to another aspect, a computer program is proposed comprising instructions for implementing a method as described hereinabove when this program is executed by a processor, notably an electronic control unit of an internal combustion engine.

According to another aspect, what is proposed is a non-transient computer-readable recording medium on which such a program is recorded.

BRIEF DESCRIPTION OF THE DRAWINGS

Other features, details and advantages will emerge upon reading the following detailed description and from examining the appended drawings, in which.

DESCRIPTION OF THE EMBODIMENTS

The present description is given in relation to an internal combustion engine, for example of the four-stroke type. As is known to those skilled in the art, such an internal combustion engine comprises one or more cylinders inside each of which there slides a piston and there is a combustion chamber. Each piston is connected by a connecting rod to a crankshaft associated with a flywheel. The duration of a complete combustion cycle (intake, compression, ignition/power and exhaust) in a combustion chamber corresponds to two revolutions, namely 720°, of the flywheel. This flywheel is toothed or is indissociable from a toothed target, and a position sensor detects the passage of each tooth. A singularity makes it possible to detect a reference position of the flywheel. The sensor associated with the crankshaft is conventionally referred to as the "crank" sensor and provides an electrical signal referred to as the "crank" signal. Each combustion chamber is also associated with valves controlled via a camshaft. The rotational speed of the latter corresponds to half the rotational speed of the flywheel. Here too, a position sensor, associated with a target, makes it possible to determine the position of the camshaft (or of each camshaft). The sensor associated with a camshaft is conventionally referred to as a "cam" sensor and provides an electrical signal referred to as a "cam" signal.

Figure 3:
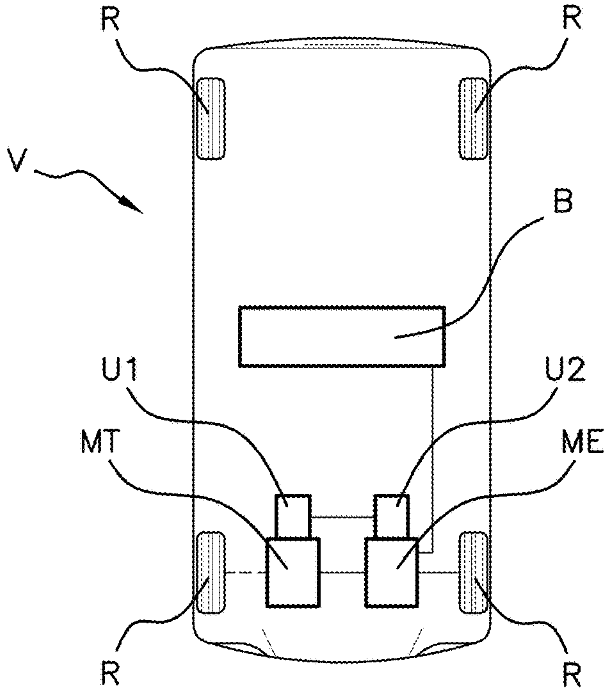
FIG. 3 is a schematic view of one embodiment of a vehicle implementing a method according to the present disclosure.

The description that follows is thus given (see FIG. 3) for a four-stroke internal combustion engine MT mounted in a vehicle V, with wheels R, which can be rotationally driven using an electric motor R. The present disclosure is as applicable to instances in which it is either the electric motor ME or the internal combustion engine MT that may drive wheels (not necessarily the same wheels of the vehicle) as it is to instances in which the driven wheels of the vehicle are driven only by at least one electric motor ME. In the latter instance, the internal combustion engine MT is connected to an electric generator set intended to (re) charge a battery B that powers the at least one electric motor ME.

The corresponding vehicle V is then said to be "hybrid" because it comprises two motive-power units operating on different energy sources. The description that follows relates to an internal combustion engine intended for such a vehicle. It relates more particularly to the scenario in which a stalling of this engine is caused by an anomaly or else the scenario in which an anomaly occurs during an intended stalling phase.

The "crank" and "cam" signals make it possible to know precisely the angular position of an internal combustion engine. They are used, inter alia, for performing the injection of fuel into said engine and/or for initiating the combustion of the fuel introduced into a combustion chamber. When one of these signals becomes missing or distorted, the position of the internal combustion engine is no longer precisely known, or is even no longer known at all. In certain instances, fuel can no longer be injected into the engine and the engine stalls. When a symptom of an anomaly is detected (for example through non-detection of a signal at a moment at which said signal is expected), provision is made in a manner known to those skilled in the art for the launch of a diagnostics procedure in order to confirm the anomaly (for example sensor failure) corresponding to the detected symptom and/or in order to determine its origin.

When the internal combustion engine stalls while not mechanically connected to the wheels of the vehicle, the stall phase is very short and the internal combustion engine is quick to stop because it is not driven by the wheels and the inertia of the vehicle or by any other driving force (or torque). This stall phase is usually (almost always) too short for the diagnostics procedure to reach completion. As a result, the diagnostics procedure and/or a synchronization procedure need(s) to be performed at the moment of the following restart. This restart will therefore take longer and carry a significant risk of consuming more (electrical) energy than a normal restart.

The novel idea behind the present disclosure is to use an electric motor to drive the internal combustion engine for at least the time it takes to perform the diagnostics procedure in its entirety.

The crank and cam signals are transmitted to an electronic management unit U1 (also known as an ECU) associated with the internal combustion engine MT. A procedure, known to those skilled in the art, makes it possible to detect a singularity in a received signal, such as, for example, a signal that is missing when a signal was expected, or conversely a signal received when no signal was expected. An absence of signal (symptom) for example needs to be observed again (generally a plurality of times) in order to confirm that there is an anomaly. A diagnostics procedure is implemented as soon as a symptom is detected in order to observe whether this symptom is reproduced or, on the other hand, to determine that this was an isolated instance and that the system is indeed operational.

The present disclosure proposes acting on an electric motor ME in order to apply a driving torque to the internal combustion engine experiencing an anomaly as soon as a symptom corresponding to said anomaly is detected. The electric motor acts on the internal combustion engine in such a way as to prevent it from stopping. It acts in such a way as to maintain, for example, an engine rotational speed of between 600 and 1000 revolutions per minute, for example of approximately 800 revolutions per minute.

In instances in which the wheels of the vehicle can be driven by the internal combustion engine and/or by an electric motor and in instances in which the wheels cannot be driven by the internal combustion engine, namely instances in which the internal combustion engine is connected to an electric machine, such as an electric generator set, to (re)charge a battery powering an electric motor driving at least one wheel of the vehicle, at least one electric motor is commanded to operate in a motor operating mode (and not as a receiver) and preferably an operating mode in which a setpoint rotational speed is imposed on the electric motor. The aforementioned electronic control unit (ECU) that manages the internal combustion engine may for example generate a signal intended for a control unit U2 that controls the relevant electric motor ME so that the latter switches into motor mode, and preferably into motor mode with control of the rotational speed of the (electric) motor. The rotational speed of the electric motor will depend on the transmission ratio between the electric motor and the internal combustion engine.

Such a strategy may also be implemented with an electric starter system for an internal combustion engine which enables the internal combustion engine to be driven when its rotational speed drops below a predetermined threshold, generally of the order of 300 revolutions per minute. This type of starter system is known to those skilled in the art. Once actuated, it is able to keep the internal combustion engine turning over and allow the diagnostics procedure to continue.

Thus, the internal combustion engine will not stop even in the event of no combustion of fuel. The diagnostics procedure reaches completion. Depending on the result of this procedure and on the setpoints, the internal combustion engine may resume normal operation if there is no fault. It may also continue to operate, but in a downgraded mode suited to the diagnosis resulting from the diagnostics procedure. If, however, the internal combustion engine, as a result of the fault, needs to stop, the detected fault is logged in a memory provided for that purpose and the next restart is performed on the basis of the detected fault. This restart may be a normal restart or else a restart in downgraded mode. The downgraded operating mode may for example be a mode of operation without a crank signal where the position of the internal combustion engine is determined only using the cam signal.

Figure 1:
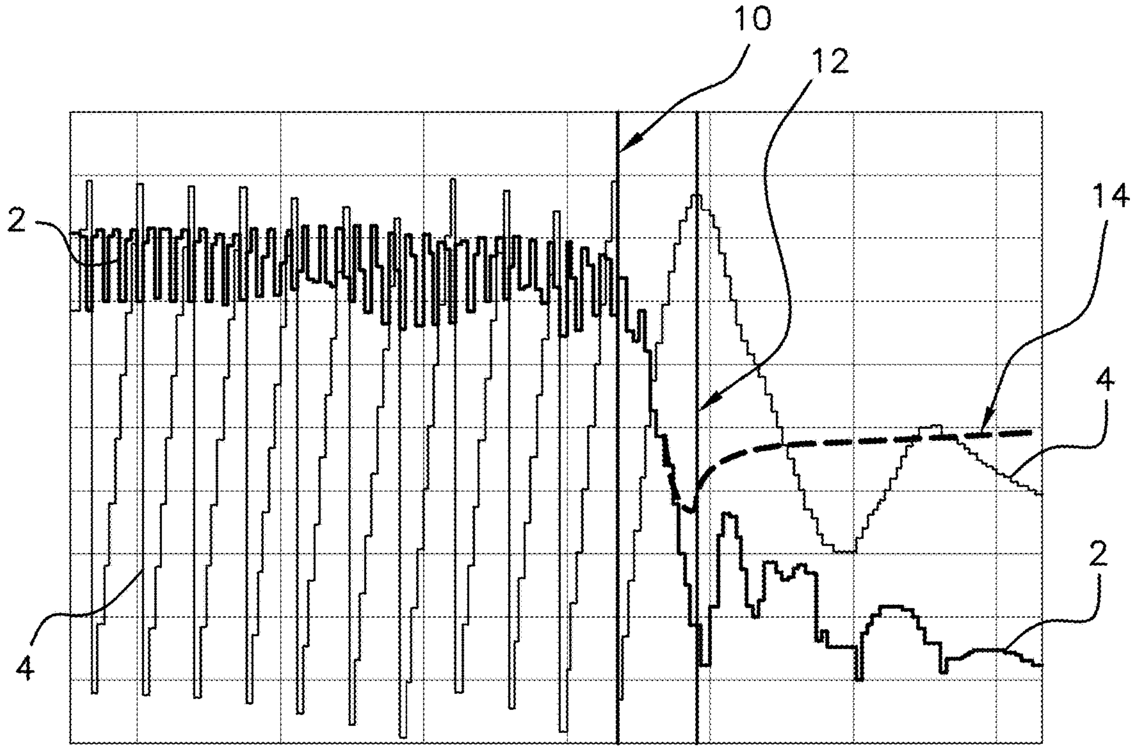
FIG. 1 shows one example of implementation of the present disclosure, showing a variation in speed and in angular position for an internal combustion engine in the stall phase.

FIG. 1 illustrates an example of the implementation of the method described above.

In this figure, a first curve 2 illustrates the rotational speed of an internal combustion engine associated with an electric motor. A second curve 4 indicates, for its part, the angular position of said internal combustion engine. This first curve 2 and second curve 4 show the stalling of the internal combustion engine: on the right-hand side of the curve it may be seen that the rotational speed (first curve 2) reaches a zero speed while the second curve 4 tends toward a given position.

The reference marker 10 in FIG. 1 corresponds to the detection of a symptom corresponding to an anomaly, for example an absence of crank signal. As soon as the symptom is detected, a command is issued to a predetermined electric motor by the electronic engine management unit that manages the internal combustion engine in order for said predetermined electric motor to adopt an operating mode with control of rotational speed. The command is executed at the reference marker 12 in FIG. 1. It is clear that there is a time offset between the reference marker 10 and the reference marker 12 because it takes time, admittedly a short time, for the symptom to be detected and again it takes time to generate, transmit and execute the command. In FIG. 1, between the moment at which the symptom is detected and the moment at which the electric motor begins to drive the rotation of the internal combustion engine, the rotational speed of the latter has lost approximately 200 revolutions per minute.

The curve in broken line corresponds to the first curve 2 when the method proposed by the present disclosure is implemented. The electric motor here, in the form of embodiment illustrated, maintains a speed of the order of 800 revolutions per minute in the internal combustion engine while the diagnostics procedure is running as far as the reference marker 14.

When the diagnosis has been made, from the reference marker 14 onward, the internal combustion engine will, depending on the diagnosis, continue to operate in its nominal mode or else will enter a downgraded operating mode or alternatively still, will stop.

Figure 2:
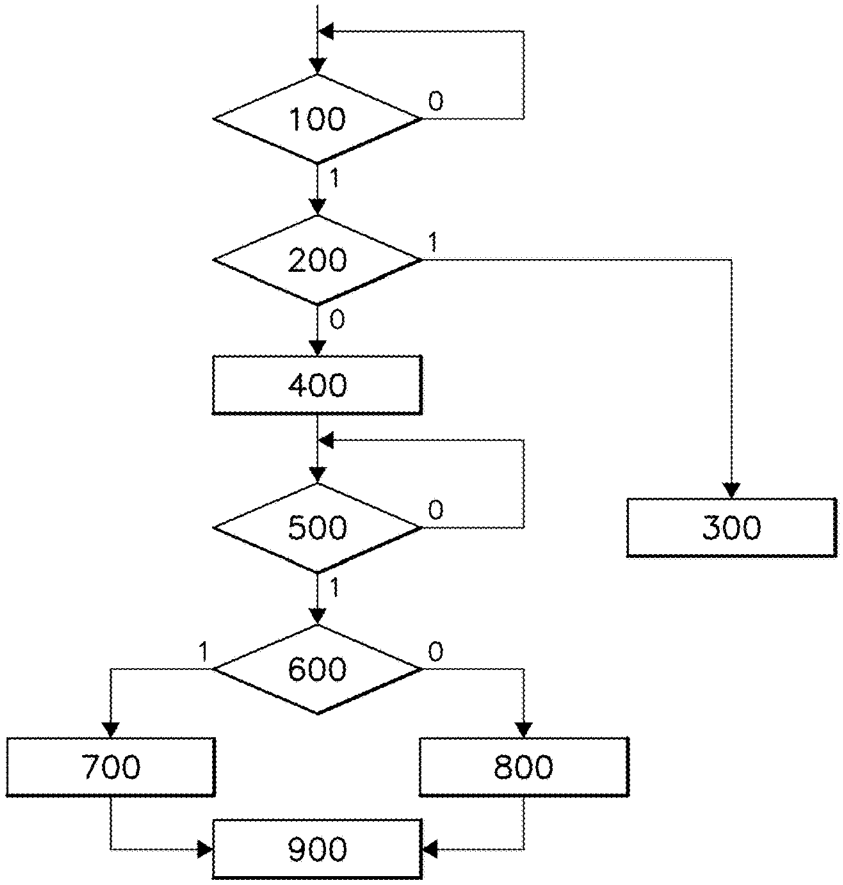
FIG. 2 shows a logic diagram for the implementation of a method according to the present disclosure.

FIG. 2 is a logic diagram summarizing a preferred embodiment of the method as described hereinabove.

According to the method proposed by way of non-limiting illustration, a first step 100 is to monitor and, where applicable, detect, a symptom corresponding to an anomaly, notably a fault, on a crank signal or a cam signal. As long as no symptom is detected (index 0 or no), the monitoring continues.

When a symptom is detected (index 1 or yes), a second step 200 may be implemented depending on the type of vehicle to which the method is being applied. The embodiment illustrated relates to a vehicle in which at least one wheel (generally two or four) can be driven directly, which is to say of course via a transmission, by the internal combustion engine. If then the wheels are connected to the internal combustion engine (index 1 or yes), then provision is made to stop implementing the method (step 300: nothing is done) because this then amounts to a "conventional" scenario of a non-hybrid vehicle and the inertia of the vehicle will allow the internal combustion engine to continue to turn over for long enough for the diagnostics procedure to be run to completion.

If the wheels are not connected to the internal combustion engine (index 0 or no), then step 400 makes provision to start at least one electric motor so that it operates as a motor and preferably in a mode with control of its rotational speed.

Progress monitoring is performed in step 500: it continues for as long as the diagnostics procedure has not reached completion. For the diagnostics procedure, an incrementation variable may be used. In order to ensure that the anomaly is truly present and not caused by an isolated specific circumstance (isolated symptom), provision is made for the symptom to re-occur several times. The incrementation variable is incremented when the symptom re-occurs and is reset if the symptom does not appear when "expected". When no symptom appears for a predetermined duration (in terms of time or in terms of angle of rotation, for example four engine revolutions), the diagnostics procedure finishes. It is also of course finished if the observed symptom re-occurs a predetermined number of times in succession. When this procedure has finished (index 1 or yes), a step 600 analyzes the diagnosis produced.

If an anomaly, or fault, associated with the observed symptom is confirmed (index 1 or yes), a downgraded mode suited to the anomaly (or the fault) is implemented (step 700).

If no anomaly has been confirmed (index 0 or no), the internal combustion engine may continue to operate in its nominal mode.

In both instances, a switch to a downgraded mode, or else continued operation of the internal combustion engine in its nominal operating mode, the at least one electric motor mentioned above in step 400 returns (step 900) to the operating mode in which it had been operating before it received the command to switch to the motor mode, preferably with control of its rotational speed. It will be noted here that the electric motor may potentially have already been in a motor mode with control of its rotational speed before it received a command from the internal combustion engine control unit, which is to say that in that case, the mode of operation of the relevant electric motor does not change.

INDUSTRIAL APPLICATION

The present technical solution may find an application notably in the engine control of an internal combustion engine associated with an electric motor in instances where a stall is brought about by an anomaly or when a fault occurs during the stall phase.

The proposed method, and the corresponding means for implementing this method, make it possible to finish making a diagnosis when a symptom of an anomaly is detected and to no longer need to wait for a restart of the internal combustion engine in order to finalise (or recommence) the diagnosis. This allows the symptom to be dealt with more rapidly and allows the suspected anomaly to be confirmed or not confirmed. In certain instances, the internal combustion engine may be restarted rather than allowing it to stall and completely stop, subsequently requiring a restart.

If a restart is needed, this restart is quicker and as a result also consumes less energy. As is known to those skilled in the art, any saving of energy at the moment of a restart is always beneficial.

The strategy proposed in the present disclosure may also be implemented in situations of unintentional stalling. For example, if a driver makes a mistake during the gearshift and instead of upshifting to the next ratio up, upshifts by three ratios in one shift, there is a risk that the internal combustion engine will stall, and if, at this moment, an anomaly occurs, the electric motor will be able to allow the diagnosis to be finalized and in addition, where stalling is unavoidable, will help the unintentional deceleration of the vehicle to be less abrupt.

The present disclosure is not limited to the proposed embodiments and to the alternative embodiments described above, which are provided solely by way of example, but it encompasses all the alternative embodiments that could be contemplated by a person skilled in the art within the scope of the intended protection.

The invention claimed is:

1. A method for managing a stall phase of an internal combustion engine associated with an electric motor in a vehicle including wheels, when an anomaly occurs during the course of a procedure to determine an angular position of the internal combustion engine, the method comprising, once a symptom of the anomaly is detected:

implementing a diagnostics procedure to one or more of: (i) confirm the anomaly (and) (ii) determine an origin of the anomaly;

reading an indicator informing as to a mechanical connection of the wheels to the internal combustion engine;

in a case in which none of the wheels of the vehicle is connected to the internal combustion engine, commanding, by a management device, the electric motor to switch to a predetermined motor operating mode is maintained for as long as the diagnostics procedure remains uncompleted; and then commanding, by the management device, the electric motor to return to another operating mode in which the electric motor was operating before being switched to the predetermined motor operating mode.

2. The method as claimed in claim 1, wherein the anomaly affects a signal from a sensor associated with a crankshaft or a signal from a sensor associated with a camshaft.

3. The method as claimed in claim 1, wherein the diagnostics procedure observes a symptom of the anomaly several times in succession, an index being incremented when a symptom of the anomaly is observed and reset when the symptom of the anomaly no longer appears.

4. The method as claimed in claim 1, wherein the predetermined motor operating mode for the electric motor is an operating mode in which a setpoint rotational speed is imposed on the electric motor.

5. The method as claimed in claim 4, further comprising selecting the setpoint rotational speed of the electric motor such that the setpoint rotational speed allows the internal combustion engine to be driven at a low-idle speed.

6. The method as claimed in claim 5, wherein the low-idle speed is between 600 and 900 revolutions per minute.

7. The method as claimed in claim 1, wherein, at the end of the diagnostics procedure, in a case in which the anomaly is confirmed, the internal combustion engine switches to another operating mode, and in a case in which no anomaly is confirmed, the operating mode of the internal combustion engine is not modified.

8. The method as claimed in claim 7, wherein the other operating mode is a downgraded mode.

9. An electronic engine management system for an internal combustion engine, the electronic engine management system, comprising:

one or more processors configured to implement the method as claimed in claim 1.

10. An automotive vehicle comprising:

an internal combustion engine; and at least one electric motor configured to drive at least one wheel of the vehicle, the at least one electric motor comprising the electronic management system as claimed in claim 9.

11. The automotive vehicle as claimed in claim 10, further comprising a transmission system providing transmission between the internal combustion engine and the at least one wheel allowing the internal combustion engine to drive said at least one wheel.

12. The automotive vehicle as claimed in claim 10, wherein the internal combustion engine is connected to an electric generator set configured to charge at least one electric battery.

* * * * *